United States Patent
Nahrwold et al.

(10) Patent No.: US 10,808,829 B2
(45) Date of Patent: Oct. 20, 2020

(54) INTEGRATED FLOW CONTROL MEMBER

(71) Applicant: Dana Automotive Systems Group, LLC, Maumee, OH (US)

(72) Inventors: Thomas L. Nahrwold, Napoleon, OH (US); Brian E. Sitterly, Norwalk, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 16/229,054

(22) Filed: Dec. 21, 2018

(65) Prior Publication Data

US 2020/0200258 A1 Jun. 25, 2020

(51) Int. Cl.
*F16H 57/04* (2010.01)
*F16H 57/02* (2012.01)

(52) U.S. Cl.
CPC ..... *F16H 57/0447* (2013.01); *F16H 57/0483* (2013.01); *F16H 2057/02052* (2013.01)

(58) Field of Classification Search
CPC ............. F16H 57/0447; F16H 57/0483; F16H 2057/02052
See application file for complete search history.

(56) References Cited

U.S. PATENT DOCUMENTS

| | | | |
|---|---|---|---|
| 5,316,106 A | 5/1994 | Baedke | |
| 5,735,765 A * | 4/1998 | Teraoka | F16H 48/285 475/160 |
| 5,839,327 A | 11/1998 | Gage | |
| 5,890,984 A * | 4/1999 | Teraoka | F16H 48/285 475/160 |
| 6,059,683 A * | 5/2000 | Teraoka | F16H 48/285 475/160 |
| 6,132,329 A * | 10/2000 | Tison | F16H 57/0412 184/11.2 |
| 6,135,241 A * | 10/2000 | Ganguly | F16H 57/0483 184/11.1 |
| 6,267,203 B1 | 7/2001 | Brissette | |
| 6,502,665 B1 * | 1/2003 | Brehob | F16H 57/0483 184/11.2 |
| 7,025,701 B2 * | 4/2006 | Cui | F16H 57/0483 475/159 |
| 7,028,810 B2 | 4/2006 | Coyle | |
| 8,684,876 B2 | 4/2014 | Corless | |
| 8,974,342 B2 * | 3/2015 | Kwasniewski | F16H 57/0409 475/160 |
| 9,238,386 B2 | 1/2016 | Dockstader | |
| 9,777,824 B2 | 10/2017 | Patil | |
| 2017/0198804 A1 | 7/2017 | Liu | |

FOREIGN PATENT DOCUMENTS

FR 2864189 A1 * 6/2005 ......... F16H 57/0483

* cited by examiner

*Primary Examiner* — Vicky A Johnson
(74) *Attorney, Agent, or Firm* — McCoy Russell LLP

(57) ABSTRACT

An axle assembly for a vehicle includes an axle housing having at least one axle shaft and a flow control member disposed therein. The flow control member is interposed between the at least one axle shaft and the axle housing. The flow control member includes a hollow cylindrical main body having at least one surface irregularity formed on an outer surface thereof that cooperates with the inner surface of the housing to form at least one fluid flow path configured to receive a fluid therein.

17 Claims, 8 Drawing Sheets

INTEGRATED FLOW CONTROL MEMBER

FIELD

The subject matter of the embodiments described herein relates generally to an axle assembly for a vehicle and, more particularly, to an axle assembly including an axle housing having a flow control member configured to enhance a transfer of thermal energy from a fluid used to provide lubrication and militate against friction and excessive wear within the axle assembly.

BACKGROUND

Conventionally, an axle assembly for a vehicle includes an axle housing having a drive pinion, a differential assembly, and a pair of axle half shafts disposed therein. The axle housing may define a fluid sump into which a volume of a fluid (e.g. lubricant) is disposed. The fluid minimizes friction between the drive pinion and a ring gear of the differential assembly, between a pair of side gears and at least a pair of pinion carrier gears, and between components of a plurality of bearing disposed in the axle housing. In addition to minimizing friction, the fluid also disperses thermal energy generated between moving parts. Depending on a temperature of the axle housing and an operational condition of the components of the axle assembly, an optimal volume of fluid needed varies.

For example, the volume of fluid disposed in the fluid sump may be too great in many instances. During ordinary operation of the vehicle, when torque loads are well below maximum, the volume of fluid in the fluid sump may result in excess windage of the drive pinion, the differential assembly, and the pair of axle half shafts. Such windage may also be exaggerated when an ambient environment of the axle assembly is minimized, such as during operation in cold weather. Additionally, during operation in cold weather, the volume of fluid may disperse thermal energy between the moving parts at a rate which prevents a viscosity of the volume of fluid from decreasing, resulting in excess windage.

Simply reducing the volume of the fluid disposed in the fluid sump to reduce windage results in many unintended consequences. During a torque intensive operation of the vehicle, when torque loads are at or near a maximum, a reduced volume of the fluid may not adequately reduce the friction generated by the drive pinion, the differential assembly, and the pair of axle half shafts. As a result, the components may wear excessively and operate in a noisy or harsh manner. Additionally, during operation of the axle assembly using the reduced volume of the fluid, the fluid may be unable to disperse thermal energy generated between the moving parts at a rate which prevents premature degradation of the fluid or damage to seals used in the axle assembly.

It would desirable to produce an axle assembly including an axle housing having a flow control member disposed therein, wherein the flow control member is configured to optimize a volume of a fluid in a fluid sump of an axle assembly and enhance a transfer of thermal energy from the fluid disposed within the axle assembly.

SUMMARY

In concordance and agreement with the present disclosure, an axle assembly including an axle housing having a flow control member disposed therein, wherein the flow control member is configured to optimize a volume of a fluid in a fluid sump of an axle assembly and enhance a transfer of thermal energy from the fluid disposed within the axle assembly, has surprisingly been discovered.

In one embodiment, a flow control assembly, comprises: a housing; and a flow control member at least partially disposed within the housing, wherein the housing and the flow control member cooperate to form at least one fluid flow path configured to receive a fluid therein.

In another embodiment, an axle assembly, comprises: an axle housing having an inner surface; at least one axle shaft disposed within the axle housing; and a flow control member disposed within the axle housing between the at least one axle shaft and the axle housing, the flow control member including a hollow cylindrical main body having at least one surface irregularity formed on an outer surface thereof, wherein the at least one surface irregularity cooperates with the inner surface of the housing to form at least one fluid flow path configured to receive a fluid therein.

In yet another embodiment, a method of thermal energy transfer within an axle assembly, comprises: providing an axle housing including a flow control member disposed therein, wherein the flow control member includes a main body having at least one surface irregularity formed on an outer surface thereof, and wherein the at least one surface irregularity cooperates with the inner surface of the housing to form at least one fluid flow path configured to receive a fluid therein; and causing a flow of the fluid through the at least one fluid flow path formed by the flow control member to transfer thermal energy from the fluid to the axle housing.

Aspects of certain embodiments, the flow control member is maintained in a stationary position within the housing.

Aspects of certain embodiments, the at least one fluid flow path is formed to extend from a first end of the flow control member to a second end thereof.

Aspects of certain embodiments, the flow control member includes a main body having a central bore formed therethrough.

Aspects of certain embodiments, the main body of the flow control member is formed from a thermally conductive material.

Aspects of certain embodiments, the flow control member includes a first surface irregularity configured to cooperate with the housing.

Aspects of certain embodiments, the flow control member includes a second surface irregularity configured to cooperate with the housing.

Aspects of certain embodiments, at least one of the first surface irregularity and the second surface irregularity cooperates with the housing to form the at least one fluid flow path configured to receive a fluid therein.

Aspects of certain embodiments, at least one of the first surface irregularity and the second surface irregularity is a helical rib structure formed about the cylindrical main body.

Aspects of certain embodiments, at least one of the first surface irregularity and the second surface irregularity abuts the inner surface of the housing to form a substantially fluid-tight seal therebetween.

Aspects of certain embodiments, at least one of the first surface irregularity and the second surface irregularity of the flow control member is formed from a thermally conductive material.

Aspects of certain embodiments, a fluid pump causes the flow of the fluid through the at least one fluid flow path of the flow control member.

Aspects of certain embodiments, the at least one fluid flow path is in fluid communication with at least one of a fluid supply reservoir and a fluid return reservoir.

Aspects of certain embodiments, at least one of the fluid supply reservoir and the fluid return reservoir is a fluid sump provided in a central portion of the axle assembly.

BRIEF DESCRIPTION OF THE DRAWINGS

The above, as well as other objects and advantages of the subject matter of the embodiments described herein, will become readily apparent to those skilled in the art from a reading of the following detailed description of the embodiments when considered in the light of the accompanying drawings in which.

DETAILED DESCRIPTION

The following detailed description and appended drawings describe and illustrate various exemplary embodiments. The description and drawings serve to enable one skilled in the art to make and use the embodiments, and are not intended to limit the scope of the embodiments in any manner.

Figure 1:
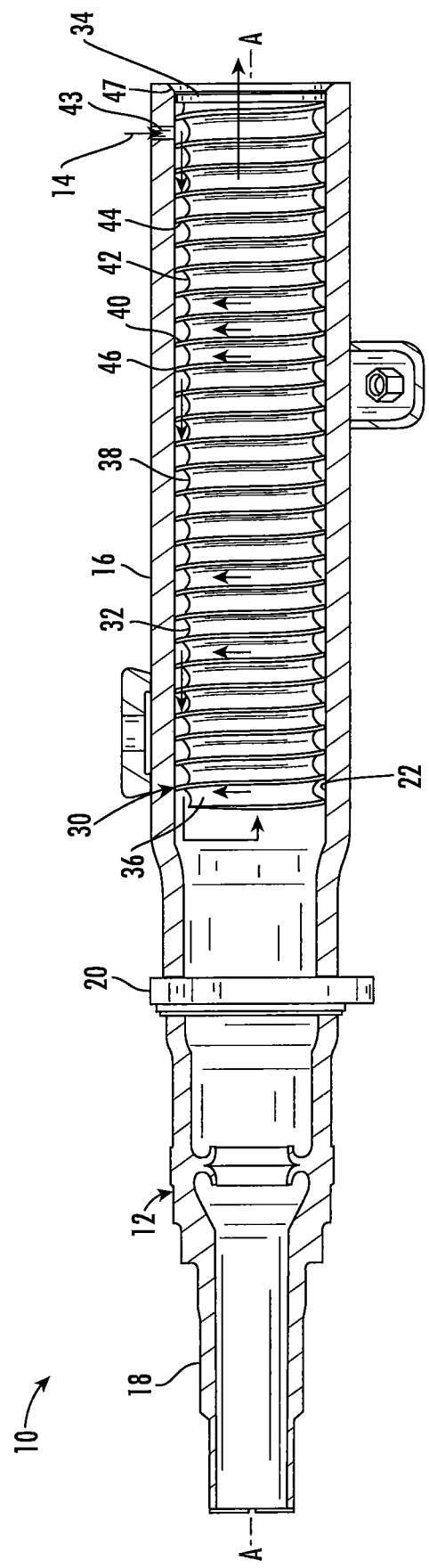
FIG. 1 is a fragmentary elevational view, partially in section, taken along a longitudinal axis of an axle housing including an integrated flow control member according to an embodiment of the subject disclosure disposed therein.
Figure 2:
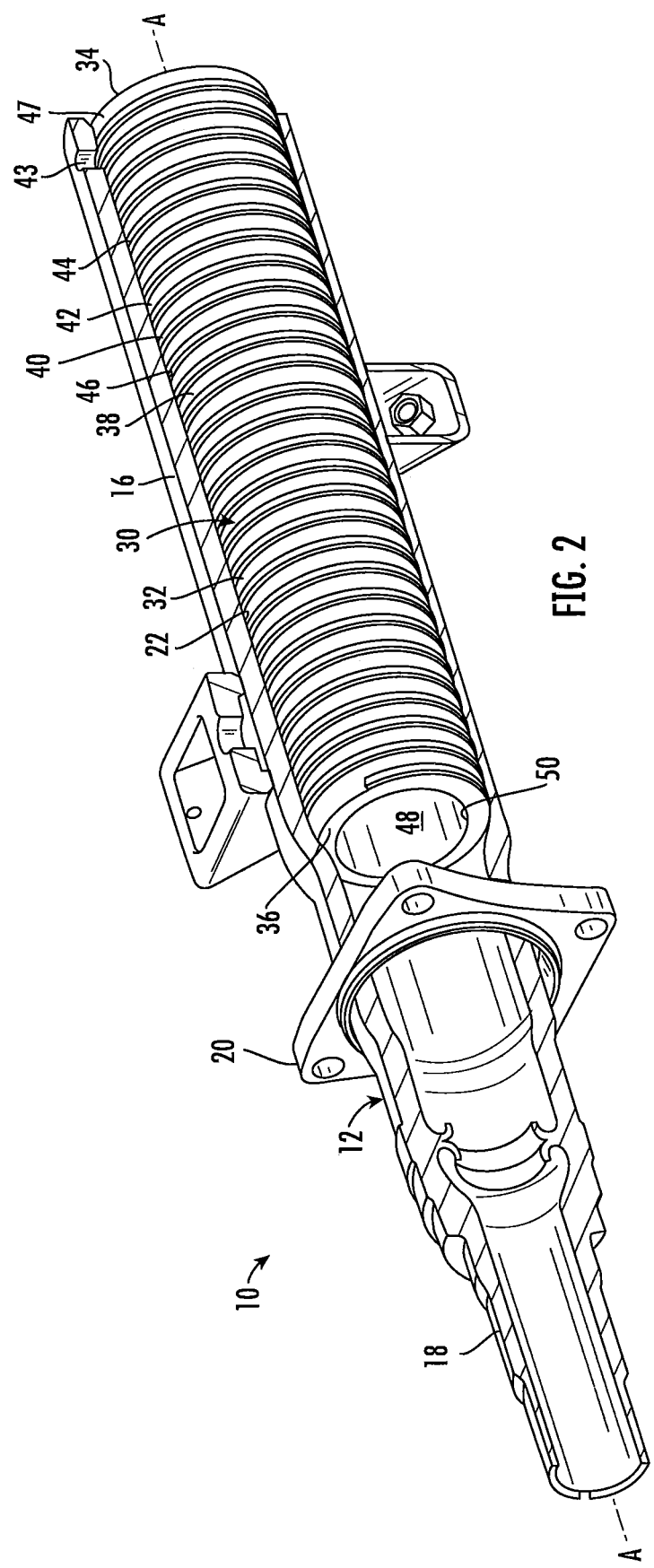
FIG. 2 is a fragmentary left-side perspective view, partially in section, taken along the longitudinal axis of the axle housing including the integrated flow control member shown in FIG. 1.
Figure 3:
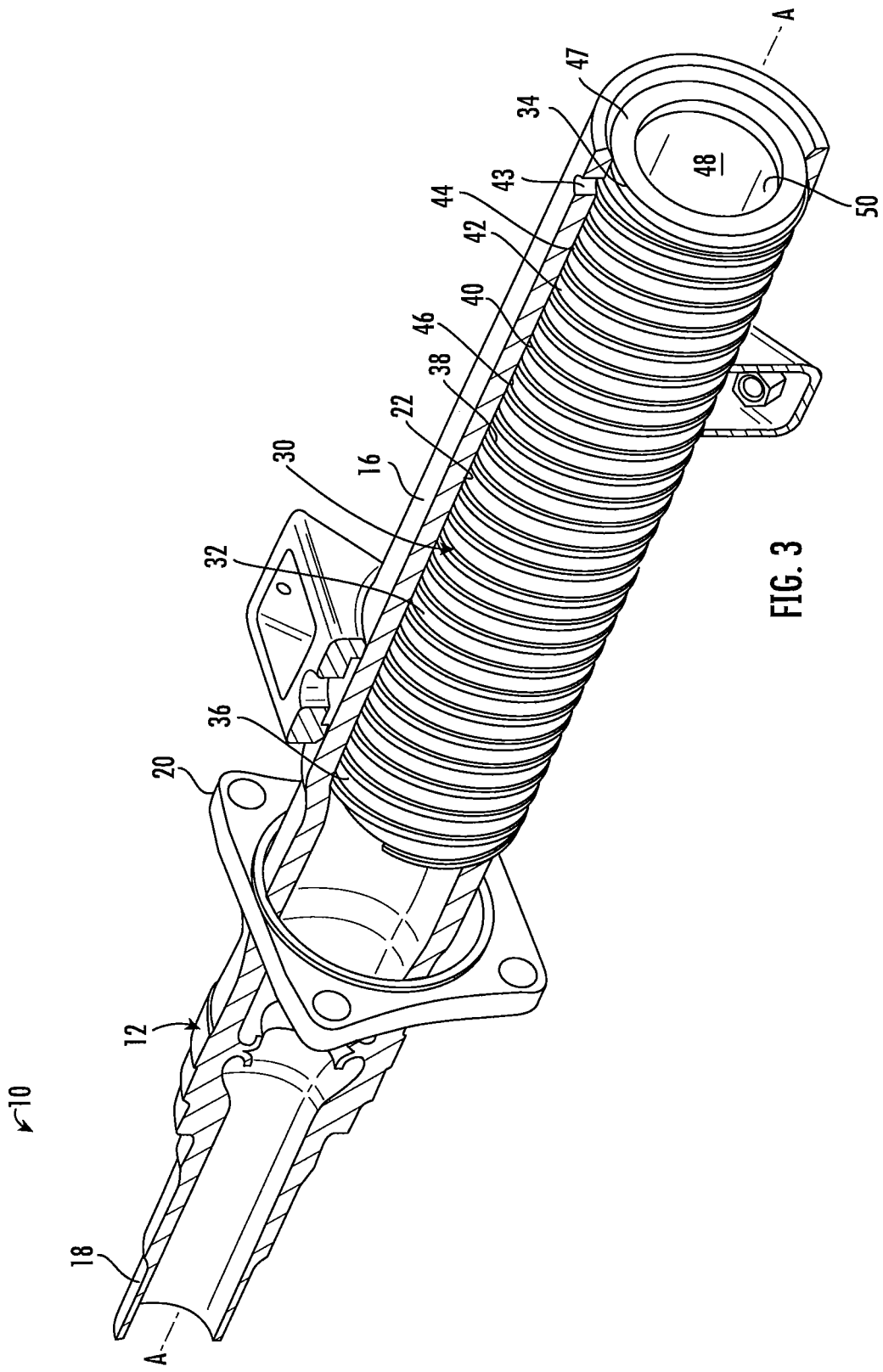
FIG. 3 is a fragmentary right-side perspective view, partially in section, taken along the longitudinal axis of the axle housing including the integrated flow control member shown in FIGS. 1 and 2.
Figure 4:
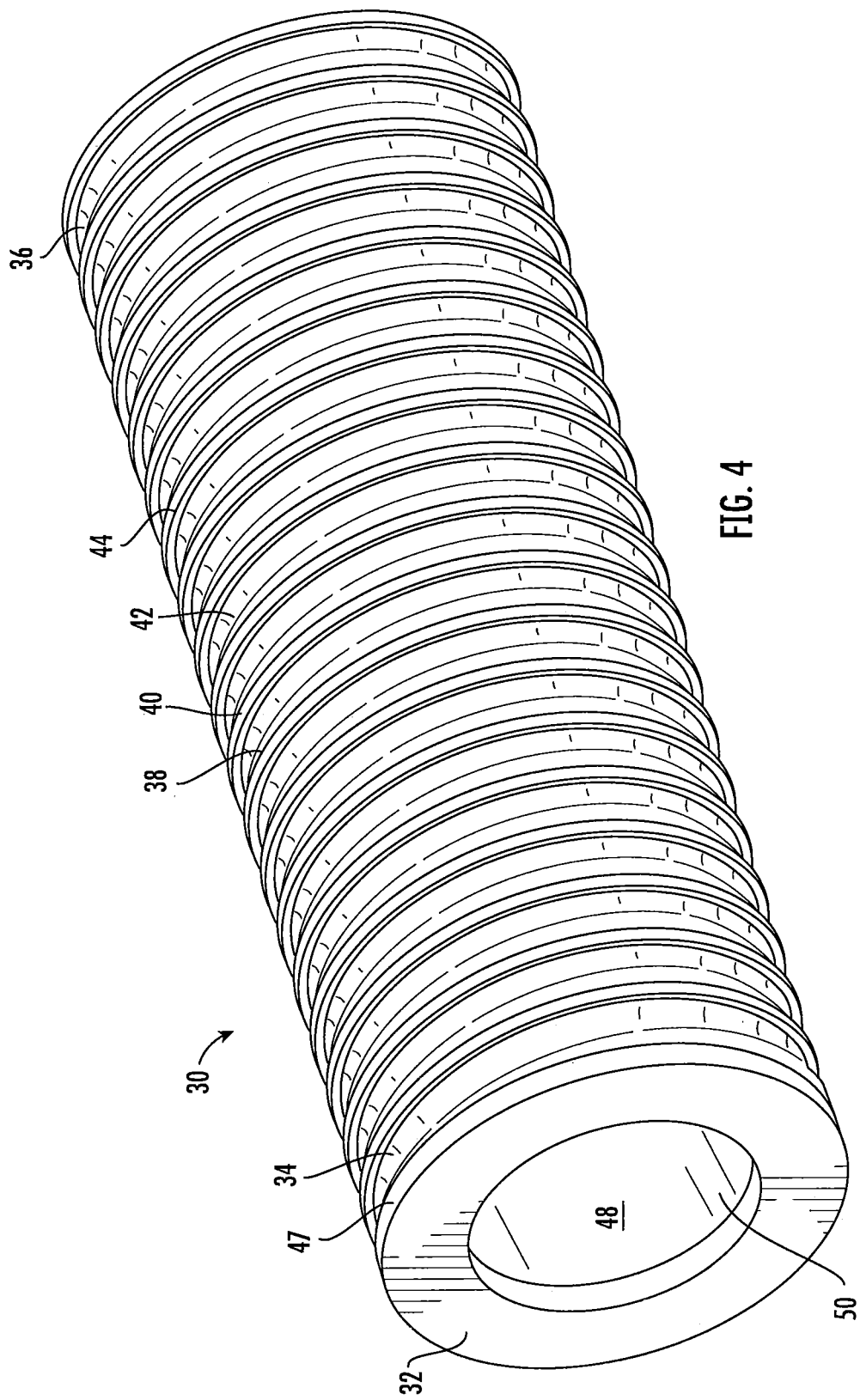
FIG. 4 is a perspective view of the integrated flow control member shown in FIGS. 1-3.

FIGS. 1-3 depict at least a portion of an axle housing 10 for an axle assembly (not depicted) of a vehicle (not depicted) according to one embodiment. Various axle housing types may be employed as the axle housing 10 as desired such as a banjo axle housing, a tandem axle housing, an electric axle housing, and the like, for example. The axle housing shown has a longitudinal axis A-A.

The axle housing 10 includes a central portion (not depicted) and opposing hollow leg segments 12 extending from the central portion. Although only a portion of one of the leg segments 12 is shown in FIGS. 1-3 and described herein, the description herein is applicable to both of the leg segments 12. The central portion includes a hollow inner cavity. In certain embodiments, a differential assembly (not depicted) including a drive gear set is disposed in the inner cavity of the central portion. The inner cavity of the central portion may perform as a fluid sump for a fluid 14 contained with the axle housing 10. Various types of fluid may be employed for the fluid 14 such as a lubricant, a coolant, and the like, for example.

As illustrated, the leg segment 12 has a generally cylindrical shape. It should be appreciated, however, that the leg segment 12 may have any shape and size as desired. The leg segment 12 shown includes a main portion 16 that terminates in an end portion or spindle 18. The spindle 18 is configured to support a wheel hub (not depicted) of the vehicle. A flange 20 is arranged between the main portion 16 and the spindle 18 to support a brake assembly (not depicted). The main portion 16 of the leg segment 12, shown in FIGS. 1-3, has a generally uniform inner diameter and a substantially smooth inner surface 22. In other embodiments, the inner diameter of the main portion 16 of the leg segment 12 may varying along the longitudinal axis A-A of the axle housing 10. For example, the inner diameter of the main portion 16 of the leg segment 12 may gradually decrease from an end adjacent to the central portion of the axle housing 10 to the spindle 18 thereof.

A flow control member 30 is at least partially disposed within the axle housing 10. As illustrated, the flow control member 30 is disposed within the leg segment 12 of the axle housing 10 such that a stationary position of the flow control member 30 is maintained. In certain embodiments, the flow control member 30 is fixedly disposed within the main portion 16 of the leg segment 12. In other embodiments, the flow control member 30 is press-fit into the main portion 16 of the leg segment 12. Various other methods of maintaining the stationary position of the flow control member 30 within the axle housing 10 may be employed as desired.

The flow control member 30 includes a main body 32 having a first end 34 and an opposing second end 36. The main body 32 shown in FIGS. 1-4 has a generally cylindrical shape and a generally uniform outer diameter. In other embodiments, the outer diameter of the main body 32 may varying along the longitudinal axis A-A of the axle housing 10. For example, the outer diameter of the main body 32 may gradually decrease from the first end 34 to the second end 36. An outer surface 38 of the main body 32 may also include at least one surface irregularity 40 such as grooves, protuberances, and the like, for example. As illustrated in FIGS. 1-4, the at least one surface irregularity 40 is a continuous helical rib structure which is wound about the outer surface 38 of the main body 32 from the first end 34 to the second end 36 thereof. The at least one surface irregularity 40 may be integrally formed with the main body 32 of the flow control member 30 or a separate component which is coupled thereto by any coupling method as desired. For example, the at least one surface irregularity 40 may be fixedly coupled to the main body 32 of the flow control member 30 by a welding process.

The at least one surface irregularity 40 is configured to form at least one fluid flow path 42 in or on the main body 32 of the flow control member 30. In an embodiment of the flow control member 30 shown in FIGS. 1-4, the at least one surface irregularity 40 forms a continuous helical fluid flow path 42 which is wound about the outer surface 38 of the main body 32 from the first end 34 to the second end 36 thereof. Although only a single fluid flow path 42 is shown, it is understood that the flow control member 30 may have any number of fluid flow paths 42 as desired. The fluid flow path 42 is in fluid communication with a fluid supply reservoir. In certain embodiments, the fluid flow path 42 is configured to receive a flow of the fluid 14 contained within the axle housing 10. As illustrated in FIGS. 1-3, the axle housing 10 may include an aperture 43 formed therein to facilitate a flow of the fluid 14 from the fluid supply reservoir and into the fluid flow path 42 of the flow control member 30. It should be appreciated that the fluid supply reservoir may be the fluid sump within the central portion of the axle housing 10 or a separate fluid reservoir, if desired. A fluid pump (not depicted) may be employed to cause the flow of the fluid 14 from the fluid supply reservoir through the aperture 43 and into the fluid flow path 42 of the flow control member 30. Various types of fluid pumps may be used for the fluid pump such as a displacement pump, a gravity pump, and the like, for example.

An outer surface 44 of the at least one surface irregularity 40 is substantially smooth and configured to abut the inner surface 22 of the axle housing 12 providing an interference fit therebetween. A substantially fluid-tight seal 46 is provided between the at least one surface irregularity 40 and the axle housing 12. The substantially fluid-tight seal may be provided by any method as desired such as the interference fit between the flow control member 30 and the axle housing 10 or at least one sealing member (not depicted) may employed therebetween. In certain embodiments, the substantially fluid-tight seal minimizes a leakage of the fluid 14 from one segment of the fluid flow path 42 into another segment of the fluid flow path 42.

In certain embodiments, a stop 47 is disposed on the first end 34 of the flow control member 30. The stop 47 provides a control of the flow of the fluid 14 from the fluid reservoir into the fluid flow path 42 and militates against the flow of the fluid 14 from bypassing the fluid flow path 42. It is understood that the stop 47 may be integrally formed with the main body 32 of the flow control member 30 or a separate component which is coupled thereto by any coupling method as desired. For example, the stop 47 may be fixedly coupled to the main body 32 of the flow control member 30 by a welding process.

A length of the fluid flow path 42 is dependent upon a number of times that the at least one surface irregularity 40 is wound about the main body 32. Accordingly, an increase in the number of times that the at least one surface irregularity 40 is wound about the main body 32 results in an increase in the length of the fluid flow path 42 formed therein. An amount of thermal energy transferred from the fluid 14 within the fluid flow path 42 to the axle housing 10 is also dependent upon the number of times that the at least one surface irregularity 40 is wound about the main body 32 and the length of the fluid flow path 42. As such, an increase in the length of the fluid flow path 42 results in an increase in the amount of thermal energy transferred from the fluid 14 to the axle housing 10.

Various materials may be employed to produce the main body 32 and the at least one surface irregularity 40 of the flow control member 30 such as a metal material and a non-metal material, for example. In certain embodiments, however, at least one of the main body 32 and the at least one surface irregularity 40 of the flow control member 30 is produced from a thermally conductive material (e.g. aluminum) which enhances the amount of thermal energy transferred from the fluid 14 to the axle housing 10. It should be appreciated that the main body 32 and the at least one surface irregularity 40 can be produced from different materials if desired.

As illustrated, the main body 32 of the flow control member 30 also includes a central bore 48 formed therethrough. The central bore 48 of the flow control member 30, shown in FIGS. 1-4, has a generally uniform diameter and a substantially smooth surface 50. In other embodiments, the diameter of the central bore 48 may varying along the longitudinal axis A-A of the axle housing 10. For example, the diameter of the central bore 48 may gradually decrease from the first end 34 of the main body 32 to the second end 36 thereof. The surface 50 of the central bore 48 may also include at least one surface irregularity, such as grooves, protuberances, and the like, for example. The at least one surface irregularity formed in or on the surface 50 of the central bore 48 may further enhance the amount of thermal energy transferred from the fluid 14 and the axle housing 10.

The central bore 48 is in fluid communication with a fluid return reservoir (not depicted). It should be appreciated that the fluid return reservoir may be the fluid sump within the central portion of the axle housing 10 or a separate fluid reservoir, if desired. The central bore 48 is configured to facilitate the flow of the fluid 14 from an end of the fluid flow path 42 of the flow control member 30 to the fluid return reservoir. An axle shaft (not depicted) is disposed within the leg segment 12 of the axle housing 10 extending through the central bore 48 of the flow control member 30. The axle shaft has a first end and an opposing second end. At least a portion of the first end is disposed within the central portion of the axle housing 10. In certain embodiments, the first end is coupled to the differential assembly disposed within the central portion so that the drive gear set of the differential assembly drivingly engages the axle shaft. The second end of the axle shaft includes a flange portion (not depicted) configured to receive the wheel hub thereon. In an embodiment, the fluid 14 from the end of the fluid flow path 42 of the flow control member flows through an interstice formed between an outer surface of the axle shaft and the surface 50 of the central bore 48 to the fluid return reservoir.

Figure 5:
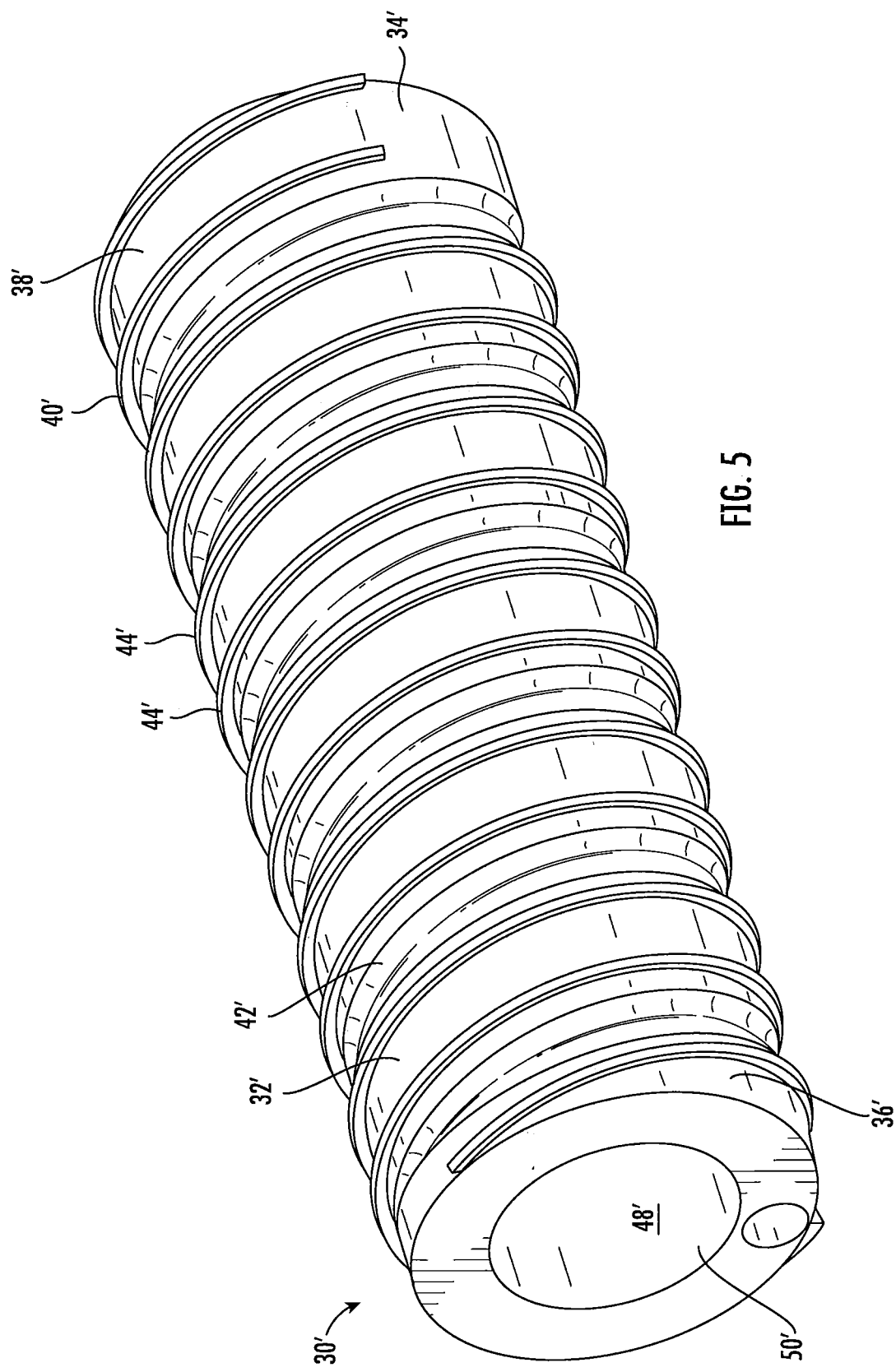
FIG. 5 is a perspective view of an integrated flow control member according to another embodiment.
Figure 6:
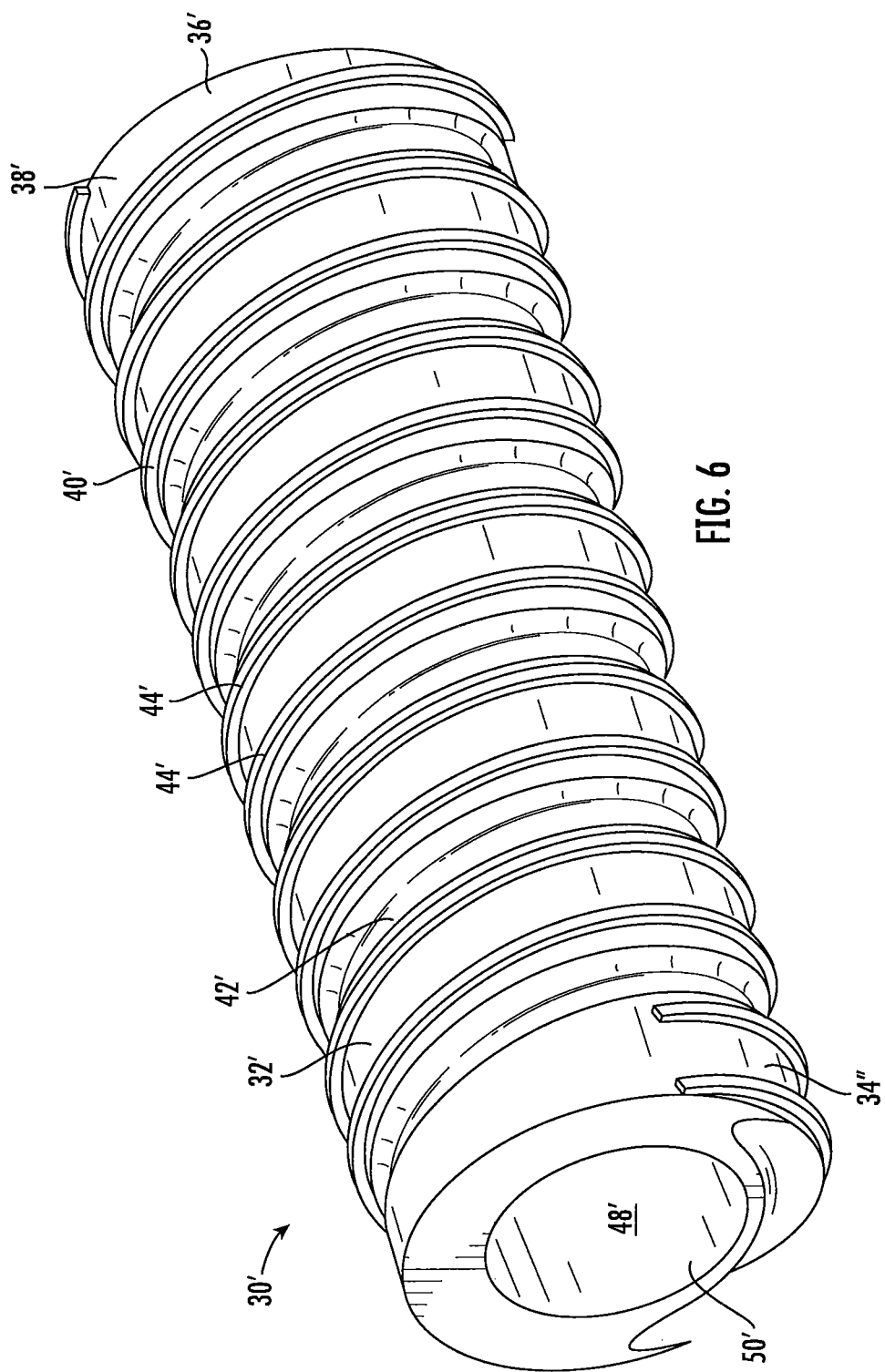
FIG. 6 is a perspective view of the integrated flow control member shown in FIG. 5.

FIGS. 5-6 show an alternative embodiment of the flow control member 30 illustrated in FIGS. 1-4. Structure similar to that illustrated in FIGS. 1-4 includes the same reference numeral and a prime (') symbol for clarity. In FIGS. 5-6, the flow control member 30' is substantially similar to the flow control member 30, except the flow control member 30' includes a plurality of surface irregularities 40', whereby the surface irregularities 40' form a continuous double helical rib structure which is wound about the outer surface 38' of the main body 32' from the first end 34' to the second end 36' thereof. As shown, the surface irregularities 40' are formed between each segment of the fluid flow path 42', resulting in an increase in a spacing between segments of the fluid flow path 42'. A substantially fluid-tight seal is formed between the inner surface 22 of the axle housing 12 and the outer surface 44' of each of the surface irregularities 40'. Accordingly, the leakage of the fluid 14 from one segment of the fluid flow path 42' into another segment of the fluid flow path 42' is further minimized.

Figure 7:
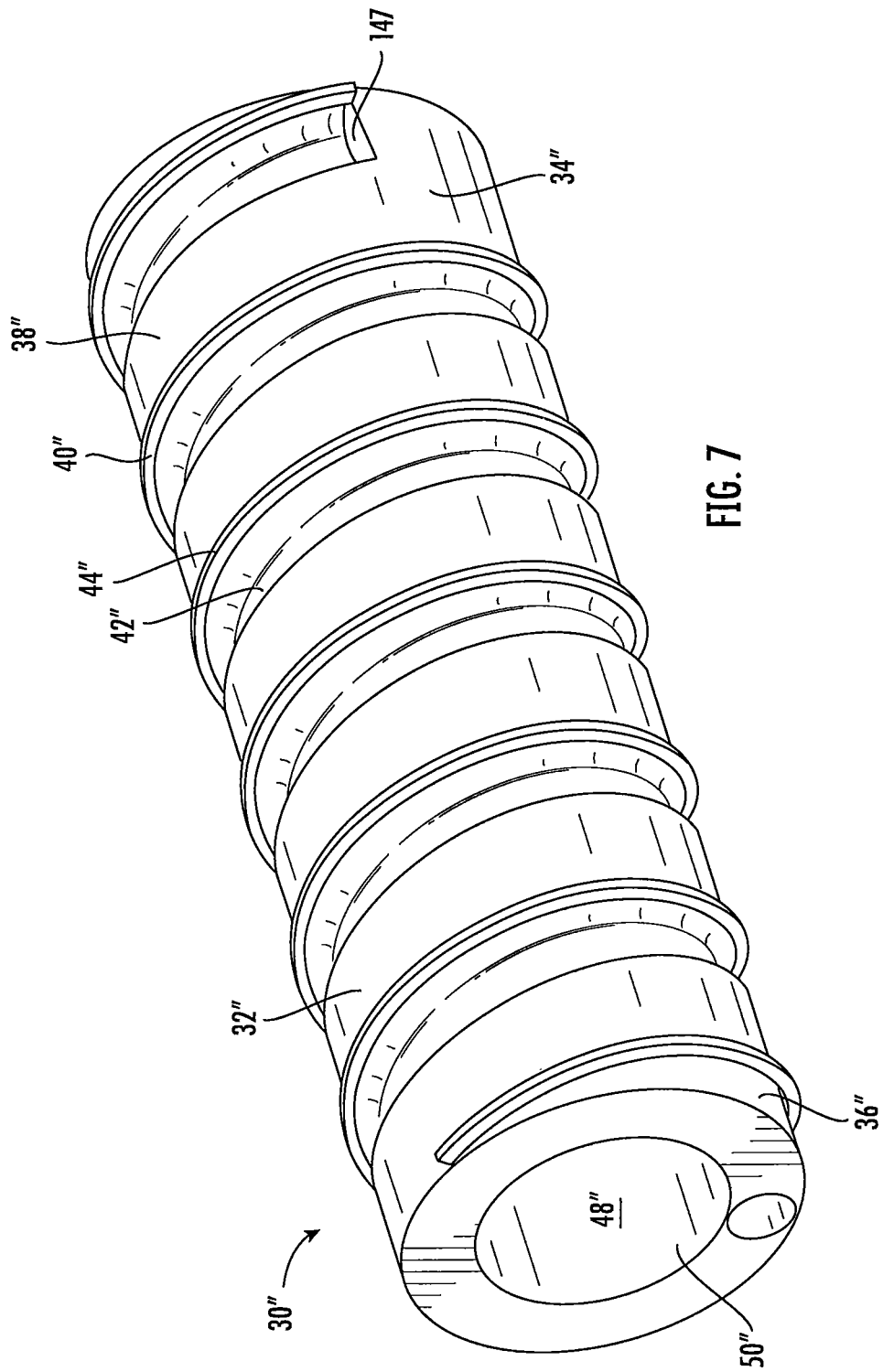
FIG. 7 is a perspective view of an integrated flow control member according to another embodiment.
Figure 8:
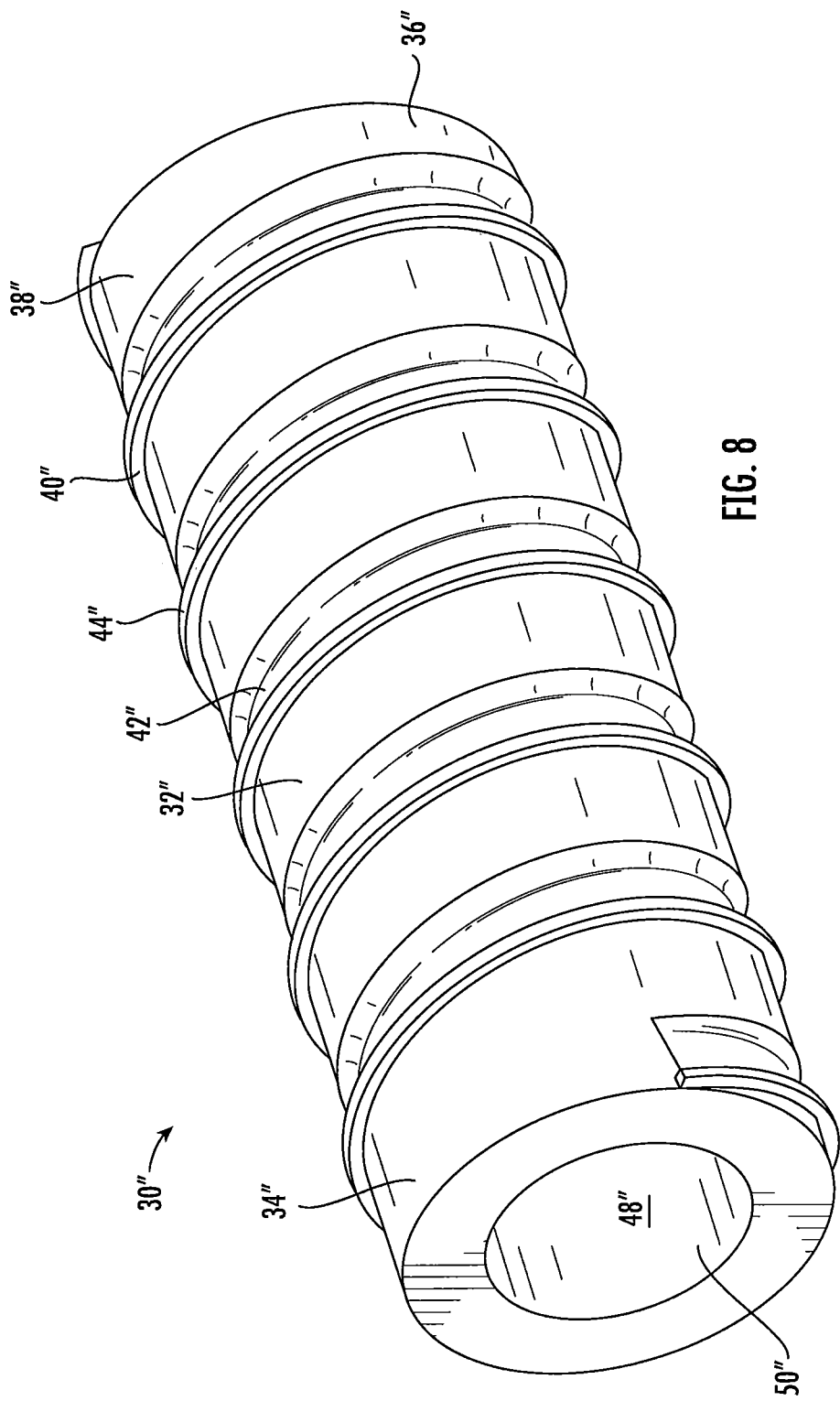
FIG. 8 is a perspective view of the integrated flow control member shown in FIG. 7.

FIGS. 7-8 show another alternative embodiment of the flow control member 30 illustrated in FIGS. 1-6. Structure similar to that illustrated in FIGS. 1-6 includes the same reference numeral and a double prime (") symbol for clarity. In FIGS. 7-8, the flow control member 30" is substantially similar to the flow control members 30, 30', except the flow control member 30" includes a surface irregularity 40", whereby the surface irregularity 40" form a continuous helical rib structure which is wound about the outer surface 38" of the main body 32" from the first end 34" to the second end 36" thereof. As shown, the surface irregularity 40" is formed between each segment of the fluid flow path 42". A spacing between segments of the fluid flow path 42" is also increased from the embodiment shown in FIGS. 1-4. A stop 147, in the form of an inlet, is formed in the first end 34" of the flow control member 30". The stop 147 provides a control of the flow of the fluid 14 from the fluid reservoir into the fluid flow path 42" and militates against the flow of the fluid 14 from bypassing the fluid flow path 42". It is understood that the stop 147 may be formed by any forming method as desired.

It is understood that the operation of the axle assembly 10 including the flow control members 30', 30" is substantially similar to the operation of the axle assembly 10. For simplicity, only the operation of the axle assembly 10 including the flow control member 30 is described hereinafter.

In operation, the fluid pump causes a heated fluid 14 to flow from the fluid supply reservoir through the aperture 43 of the axle housing 10 and into the flow control member 30. The fluid flow path 42 receives the heated fluid 14 from the fluid supply reservoir therein. The heated fluid 14 flows within the fluid flow path 42 about the main body 32 of the flow control member 30. As the heated fluid 14 flows within the fluid flow path 42, thermal energy transfers from the fluid 14 through the axle housing 10 and into an atmosphere surrounding the axle housing 10. Accordingly, a temperature of the fluid 14 decreases as the fluid 14 flows within the fluid flow path 42 from the first end 34 of the flow control member 30 to the second end 36 thereof. The cooled fluid 14 then flows from the fluid flow path 42 of the flow control member 30 through the central bore 48 thereof and to the fluid return reservoir. In certain embodiments, the fluid supply reservoir and the fluid return reservoir are both the fluid sump formed in the axle housing 10. Once the cooled fluid 14 returns to the fluid sump of the axle housing 10, thermal energy transfers from the components disposed within the axle housing 10 and is absorbed by the fluid 14. The process is then repeated as many times as desired.

From the foregoing description, one ordinarily skilled in the art can easily ascertain the essential characteristics of the subject matter of the embodiments described herein and, without departing from the spirit and scope thereof, can make various changes and modifications to the embodiments to adapt them to various usages and conditions.

What is claimed is:

1. A flow control assembly, comprising:
    a housing; and
    a flow control member disposed within a first portion of the housing,
        wherein the housing and the flow control member cooperate to form at least one fluid flow path configured to receive a fluid therein, and
        wherein an inner diameter of a second portion of the housing is reduced relative to the first portion of the housing, where the second portion of the housing is adjacent to the first portion of the housing without the flow control member disposed therein,
        wherein the flow control member includes a first surface irregularity configured to cooperate with the housing,
        wherein the flow control member includes a second surface irregularity configured to cooperate with the housing, and
        wherein at least one of the first surface irregularity and the second surface irregularity abuts an inner surface of the housing to form a substantially fluid-tight seal therebetween.

2. The flow control assembly of claim 1, wherein the flow control member is maintained in a stationary position within the housing.

3. The flow control assembly of claim 1, wherein the at least one fluid flow path is formed to extend from a first end of the flow control member to a second end thereof.

4. The flow control assembly of claim 1, wherein the flow control member includes a main body having a central bore formed therethrough.

5. The flow control assembly of claim 4, wherein the main body of the flow control member is formed from a thermally conductive material.

6. The flow control assembly of claim 1, wherein at least one of the first surface irregularity and the second surface irregularity cooperates with the housing to form the at least one fluid flow path configured to receive a fluid therein.

7. The flow control assembly of claim 1, wherein at least one of the first surface irregularity and the second surface irregularity is a helical rib structure formed about a cylindrical main body.

8. The flow control assembly of claim 1, wherein at least one of the first surface irregularity and the second surface irregularity of the flow control member is formed from a thermally conductive material.

9. An axle assembly, comprising:
    an axle housing having an inner surface; and
    a flow control member disposed within the axle housing, the flow control member including a hollow cylindrical main body having at least one surface irregularity formed on an outer surface thereof, wherein the at least one surface irregularity cooperates with the inner surface of the axle housing to form at least one fluid flow path configured to receive a fluid therein, wherein the at least one surface irregularity is helical and abuts the inner surface of the axle housing to form a substantially fluid-tight seal therebetween.

10. A method of thermal energy transfer within an axle assembly, comprising:
    providing an axle housing including a flow control member disposed therein,
        wherein the flow control member includes a main body having at least one surface irregularity formed on an outer surface thereof,
        wherein the at least one surface irregularity cooperates with an inner surface of the axle housing to form at least one fluid flow path configured to receive a fluid therein, and
        wherein the at least one surface irregularity is a helical rib structure that abuts the inner surface of the axle housing to form a substantially fluid-tight seal therebetween; and
    causing a flow of the fluid through the at least one fluid flow path formed by the flow control member to transfer thermal energy from the fluid to the axle housing.

11. The method of claim 10, wherein the main body of the flow control member further includes a central bore formed therethrough.

12. The method of claim 10, wherein the helical rib structure is wound about the outer surface of the main body of the flow control member.

13. The method of claim 10, wherein the at least one surface irregularity comprises a metal material.

14. The method of claim 10, wherein a fluid pump causes the flow of the fluid through the at least one fluid flow path of the flow control member.

15. The method of claim 10, wherein at least one of the main body and the at least one surface irregularity is formed from a thermally conductive material.

16. The method of claim 10, wherein the at least one fluid flow path is in fluid communication with at least one of a fluid supply reservoir and a fluid return reservoir.

17. The method of claim 16, wherein at least one of the fluid supply reservoir and the fluid return reservoir is a fluid sump provided in a central portion of the axle assembly.

\* \* \* \* \*